(No Model.)  2 Sheets—Sheet 1.
C. A. ELLISON.
TWO WHEELED VEHICLE.
No. 338,590. Patented Mar. 23, 1886.
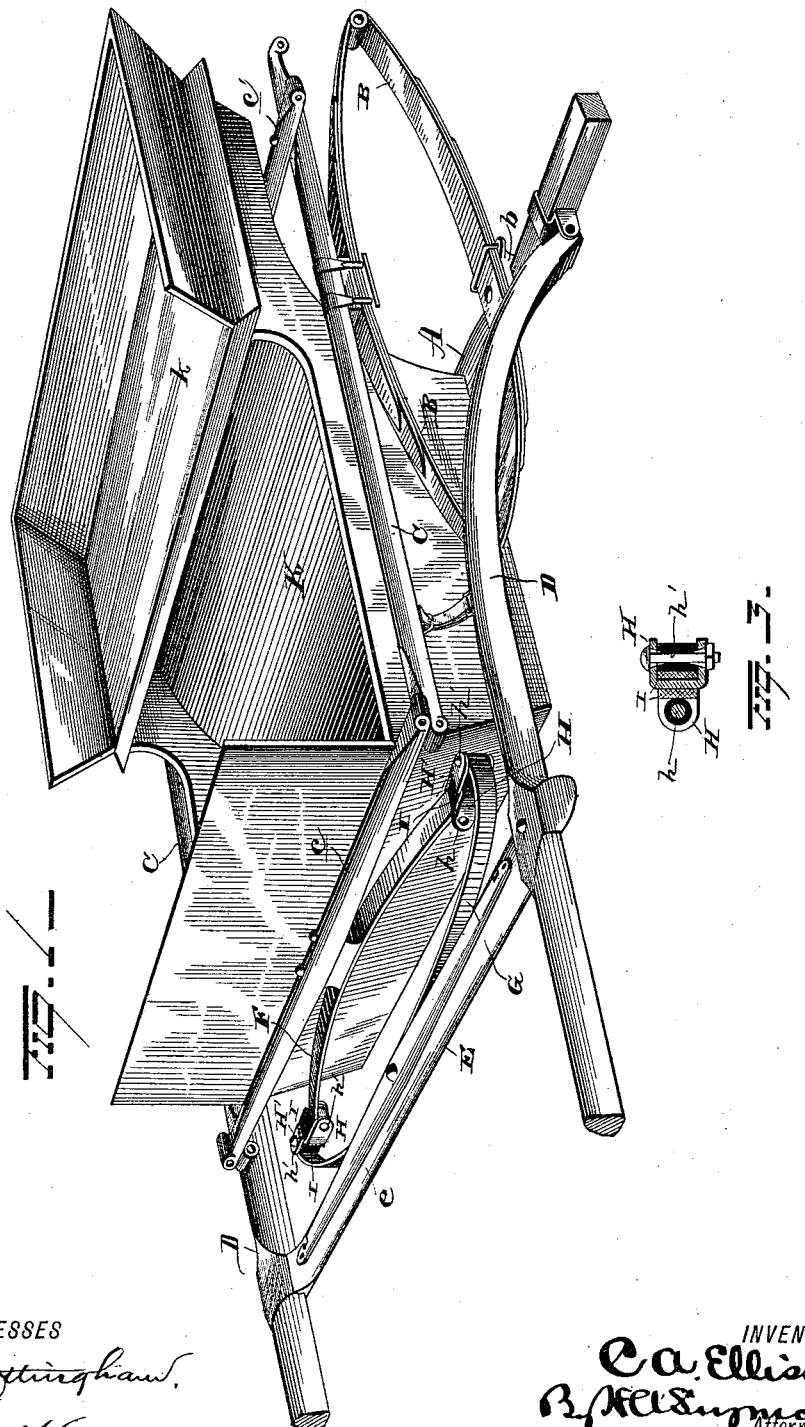
WITNESSES
INVENTOR (No Model.) 2 Sheets—Sheet 2.
C. A. ELLISON.
TWO WHEELED VEHICLE.
No. 338,590. Patented Mar. 23, 1886.
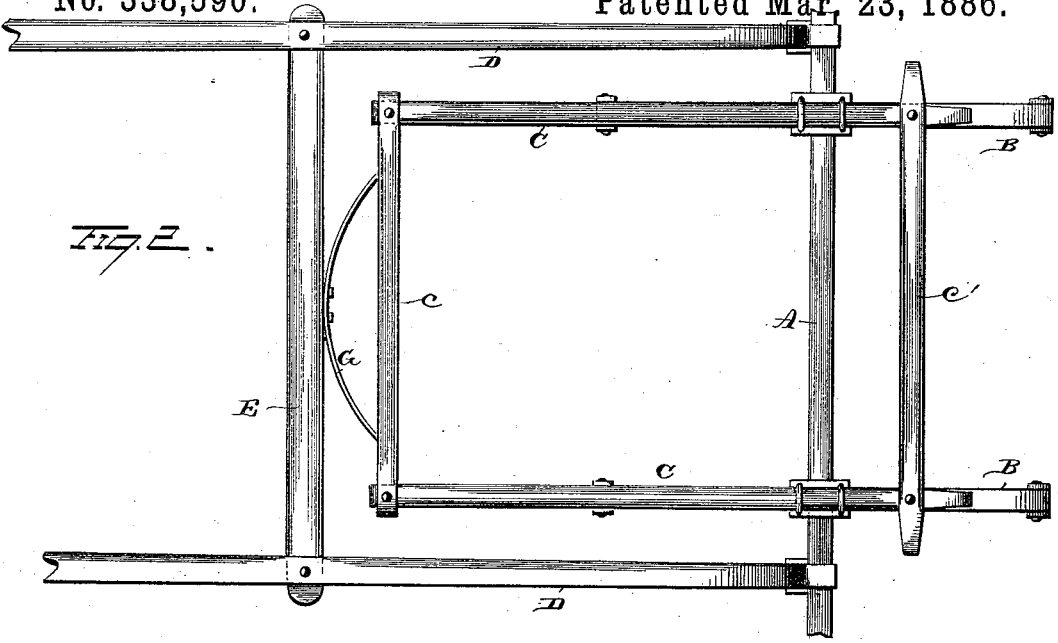
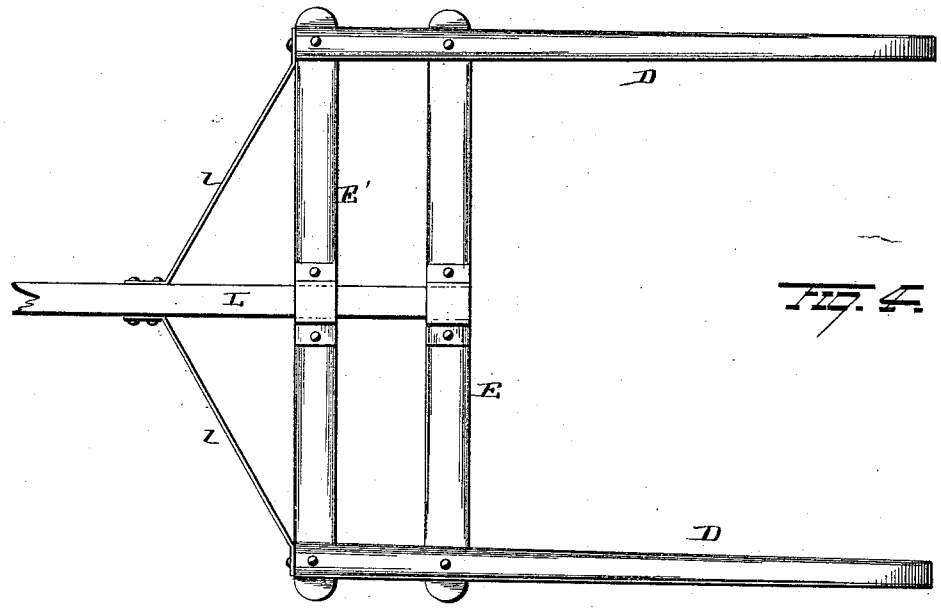
WITNESSES
INVENTOR

UNITED STATES PATENT OFFICE.

CHARLES AUGUSTUS ELLISON, OF MINEOLA, NEW YORK.

TWO-WHEELED VEHICLE.

SPECIFICATION forming part of Letters Patent No. 338,590, dated March 23, 1886.

Application filed October 10, 1885. Serial No. 179,509. (No model.)

*To all whom it may concern:*

Be it known that I, CHARLES AUGUSTUS ELLISON, of Mineola, in the county of Queens and State of New York, have invented certain new and useful Improvements in Two-Wheeled Vehicles; and I do hereby declare the following to be a full, clear, and exact description of the invention, such as will enable others skilled in the art to which it appertains to make and use the same.

My invention relates to an improvement in two-wheeled vehicles.

The object is to provide simple and effective means for preventing the horse motion from affecting the person or persons in the vehicle, and to further provide a neat and durable two-wheeled vehicle the body of which may be made in any of the ordinary styles—such as an open buggy, top buggy, cart, &c.

With these ends in view my invention consists in certain features of construction and combinations of parts, as will be hereinafter described, and pointed out in the claims.

In the accompanying drawings, Figure 1 is a view of a portion of a two-wheeled vehicle embodying my invention. Fig. 2 is a top plan view, the body being removed; and Fig. 3 is a detached view of the spring connecting the front cross-bar on the body-supporting frame with the cross-bar uniting the shafts. Fig. 4 is a modification.

A represents the axle. A pair of elliptic springs, B, are secured to the axle A by means of clips $b$, the said springs occupying positions transversely to the axle and a sufficient distance apart to admit the body of the vehicle between them.

To the tops of the springs B are secured a pair of side bars, C, the latter being connected at or near their front and rear ends by cross-bars $c$ and $c'$, respectively.

The shafts D are coupled to the axle A in a manner quite similar to that in which shafts are ordinarily coupled to the front axle of a four-wheeled vehicle, and are thereby allowed to play up and down without tilting the axle or straining the springs or shafts. At a point a short distance forward of the cross-bar $c$ the shafts are firmly united by a cross-bar, E, to which the whiffletree $e$ is secured. A semi-elliptic or open V-shaped spring, F, is secured in a vertical position to the middle of the cross-bar $c$ transversely to the body-supporting frame, its ends when in their normal position resting nearly or quite in a horizontal plane with the cross-bar E. A second semi-elliptic spring, G, is secured in a horizontal position to the back of the cross-bar E, its ends being coupled to the ends of the spring F as follows: A pair of shackles, each consisting of two similar sections, H H', firmly united together, are adapted to hold the two securing-bolts, $h\ h'$, with which they are each provided, at right angles to each other, thereby conforming to the positions which the adjacent ends of the springs G F occupy with respect to each other, and leaving each of said springs free to move in its own plane.

The springs F and G may consist of one or more leaves as desired.

Rubber cushions I are introduced between the ends of the springs and the shackles to prevent rattling.

K represents the vehicle-body. The body here shown is of the buggy form, its rear end resting on the cross-bar $c'$, and its front end secured to the cross-bar $c$, the bottom of the body extending more or less below the supporting-frame C $c\ c'$.

The seat $k$ is located in such a position as to bring the weight of the person riding over the axle. When the weight on the seat $k$ depresses the springs B, it tends to slightly increase the distance between the cross-bar $c$ and the shaft cross-bar E, since the said depression will draw the bar $c$ slightly nearer the axle A, and when the springs B rebound they will tend to carry the cross-bar $c$ slightly nearer the bar E. If, however, the body K as a whole be depressed, it will tend to carry the cross-bar $c$ slightly nearer the bar E. These motions toward and away from the bar E are taken by the springs F and G, which serve to keep the body steady, ease the rebound of the springs B, and at the same time allow the motion necessary to prevent jerking or straining. A pair of safety-straps, $m$, are loosely secured around the side bars and shafts, as shown.

It will be noticed that there is more or less of a twisting strain exerted on the couplings uniting the springs F G. To prevent damage therefrom, the eyes in which the bolts h h' work are made a trifle larger at the ends than in the middle, thereby allowing a tilting play.

The horse motion, which becomes such a nuisance in a great majority of the two-wheeled vehicles now in use, and the obviating of which has been attempted in so many ways, is taken up in the present instance by the spring F, working vertically beneath the front of the body-supporting frame as the shafts are tilted up and down.

The modification represented in Fig. 4 consists in adapting the vehicle to receive a pole instead of a pair of shafts. This is accomplished by simply cutting off the shafts D a short distance forward of the cross-bar E, connecting them by a second cross-bar, E', and attaching thereto the ordinary form of loop for receiving the pole L. A pair of short diagonal braces, l, will also serve to hold the pole more securely in its position.

The vehicle as above constructed is capable of being manufactured in a durable and neat manner at a very low cost, and is at the same time very easy riding and comfortable in all respects.

The body may be of the cart form, or may be adapted to receive a top, its particular shape forming no essential part of my present invention.

Having fully described my invention, what I claim as new, and desire to secure by Letters Patent, is—

1. In a two-wheeled vehicle, the combination, with the axle, the shafts attached thereto, and the body-supporting frame attached to the axle by springs, of a spring consisting of a horizontal section and a vertical section coupled together and connecting the body-supporting frame with a cross-bar attached to the shafts, substantially as set forth.

2. The combination, with the springs secured on the axle and the shafts coupled to the axle in a vertically-rocking adjustment, of the body-supporting frame secured to the axle-springs and to the shaft cross-bar in a vertically and longitudinally yielding adjustment, substantially as set forth.

3. The combination, with the axle and a pair of elliptical springs secured thereon, of a pair of side bars secured on said springs, a pair of cross-bars connecting the side bars, and a vertically and longitudinally yielding spring connecting the front cross-bar with the shafts, substantially as set forth.

In testimony whereof I have signed this specification in the presence of two subscribing witnesses.

CHARLES AUGUSTUS ELLISON.

Witnesses:
FRANK P. SEAMAN,
GEO. S. EMORY.